March 18, 1941.                 A. RONNING                 2,235,042
                          HAND PROPELLED VEHICLE
                          Filed March 14, 1940
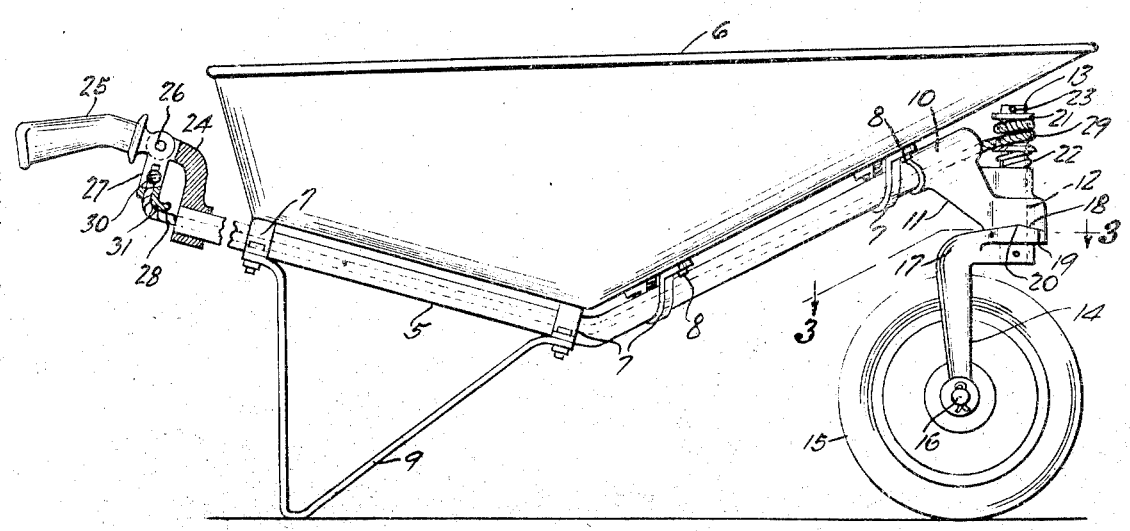
Fig-1-
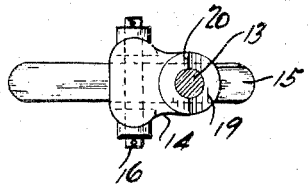
Fig-3-
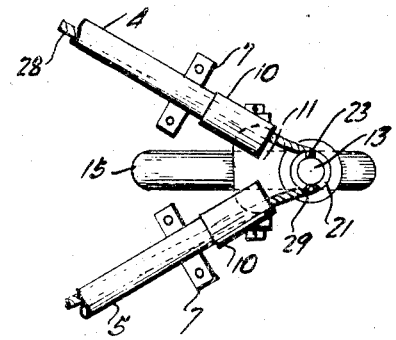
Fig-2-
Inventor
ADOLPH RONNING
By Carlsen & Hagle
        Attorneys Patented Mar. 18, 1941

2,235,042

UNITED STATES PATENT OFFICE 2,235,042

HAND PROPELLED VEHICLE

Adolph Ronning, Minneapolis, Minn.

Application March 14, 1940, Serial No. 323,988

9 Claims. (Cl. 280—48)

This invention relates to improvements in hand propelled vehicles of the type generally known as wheelbarrows.

Vehicles of this type, embodying a single forwardly arranged center wheel and side handles supporting the transporting body or receptacle, have had one disadvantage. This lies in the fact that to steer the vehicle toward either side it has been necessary to bodily swing its rear around to angle the wheel in the desired direction. Such maneuvering is sometimes difficult due to lack of space and furthermore requires more than the necessary amount of work and steps of the operator using the vehicle.

It is the primary object of my invention therefore to provide means whereby a convenient manipulation of the handles themselves, without interference with their normal use in supporting and propelling the vehicle, may be used to angle the supporting wheel about an upright steering axis to thus steer the vehicle at its forward end to either side desired. Another object is to provide in a vehicle of this kind a means whereby the wheel, once angled or steered toward either side, will have a tendency to return to a centered or straight ahead position and will retain itself in such position except when positively angled by steering manipulation of the handles.

Still another object is to provide an improved and effective handle construction and mounting to enable the operator to make the necessary steering movements without shifting his hands on the handles or at any time losing control over the vehicle.

These and other more detailed and specific objects will be disclosed in the course of the following specification, reference being had to the accompanying drawing, in which—

Fig. 1 is a side elevation of a vehicle constructed in accordance with my invention, a portion of the adjacent handle being shown in section.

Fig. 2 is a plan view of the forward end portion of the vehicle with the body or receptacle removed.

Fig. 3 is a section along the line 3—3 in Fig. 1.

This application is a continuation in part from my copending application for patent on a Manually propelled vehicle, Serial No. 209,283 filed May 21, 1938.

Referring more particularly and by reference numerals to the drawing, the vehicle of my invention is seen to comprise a frame made up of spaced, laterally disposed tubular side or handle members 4 and 5 upon which is secured the barrow body or receptacle 6. The mounting is by means of clamps 7 set astraddle the members 4 and 5 and riveted or bolted to the body as indicated at 8. Legs or stands 9 are secured to the rearmost clamps on each side member to support the rear of the vehicle upon the ground when not in use.

The forward ends of the side members 4 and 5 converge in the horizontal plane and also as here shown, and due to the shape of the body 6, incline upwardly over the forward portions of their length. These forward ends, thus brought into proximity, are received and secured in the tubular sockets 10 of a bracket or casting member 11 which thus rigidly joins the side members. Said bracket or casting member 11 has a vertically axised bearing 12 for the reception of the steering post or pivot pin 13 rigidly extended and upwardly projected from a wheel fork 14 in which the supporting wheel 15 is journaled by axle 16. The forward and upward extension of the side members and resulting clearance beneath the casting 11 enables the wheel and fork to be mounted immediately beneath as shown.

The wheel fork 14 is angularly bent or formed at its upper end 17 to thus forwardly dispose the steering post 13 with respect to the axis of the wheel 15, and said wheel will thus have a castering action as will be evident. The meeting faces of the casting 11 and fork 14 designated generally at 18 and 19 respectively, are obliquely and oppositely sloped from radial lines 20 which bisect them and extend transversely with respect to the normal straight ahead line of travel of the vehicle and its load being imposed on these faces, they will have a cam action such that they will normally seek the condition of engagement shown in Fig. 1 to thereby hold the wheel 15 in position for straight forward or rearward travel. Angling of the wheel to either side will of course cause a slight upward displacement of the casting 11 along the post 13 and sufficient play is provided for this purpose as will appear.

The castering and self-centering action of the wheel is an important feature of my invention and it will be evident that the wheel, when once angled to either side, will as it is released, and by virtue both of the caster and of the cam action, return itself quickly to straightaway position.

A pulley or sheave 21 is rigidly secured to an upper end of the steering post 13 in spaced relation to the casting 11 and an expansion coil spring 22 is placed over the post between the sheave and casting. This spring permits the necessary play of the post and at the same time aids in the centering of the wheel. A pin 28 through the post prevents upward displacement of the sheave.

The side members 4 and 5 are rearwardly extended from the body and are provided with upwardly and rearwardly projecting, rigidly mounted brackets or handle supports 24. Handles 25, shaped as shown for easy and comfortable gripping, are pivotably mounted at 26 by their forward ends to the supports 24 and have the crank fingers 27 depended downwardly to points substantially in alignment with the rear, open ends of the side members. A cable 28 has its medial portion wrapped as at 29 around the sheave 21 and the ends are then extended through the tubular side members rearwardly for fastening at 30 in sockets provided in the fingers 30. The construction is thus such that an upward movement of either handle 25 will, through a rearward movement of the connected finger 27, exert a pull on that end of the cable 28 causing an oscillation of the sheave 21 and steering post 18 to angle the wheel 16 to either side. Rounded ends 31 of the fingers 27 engage the cable in this action and prevent sharp bending and fraying thereof. Only one handle is shown in the drawing but the structure is of course duplicated on the other side member.

In operation the vehicle is lifted and propelled in usual manner by an equal lift on the handles 25 grasped by the operator. However, an upward swinging movement of either handle, which may be readily carried out by a slight flexing of the wrist, will result in a pull on the cable 28 such that the steering post 18 will be oscillated to steer the wheel in the desired direction. Release of this pressure or pull will then enable the wheel to quickly return to straight-away position by the castering and cam action hereinbefore described. It will be evident therefore that the operator may conveniently steer the vehicle as desired while maintaining complete control of movement and balance.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hand propelled vehicle, comprising a frame forwardly supported by at least one wheel mounted for steering movements, a pair of supporting and propelling handles extending rearwardly from the frame for supporting and propelling the vehicle and pivotally connected thereto for up and down swinging movements while supporting and propelling the vehicle, and means operated by swinging movement of the handles for steering the wheel.

2. A hand propelled vehicle comprising a frame supported forwardly by at least one wheel mounted for steering movements about a vertical axis, a pair of supporting and propelling handles extending rearwardly from the frame for supporting and propelling the vehicle and pivotally mounted for swinging movements, and means connecting both handles to the wheel and operable by relatively opposite swinging movements thereof while supporting the vehicle for steering the wheel.

3. A hand propelled vehicle comprising a frame supported forwardly by at least one wheel mounted for steering movements about a vertical axis, a pair of handles rearwardly extending from the frame for supporting and propelling the same and pivotally mounted for swinging movements, flexible means connected between the handles and the wheel and operable by swinging movements of the handles in opposite directions for steering the wheel.

4. A hand propelled vehicle comprising a frame having a forwardly located and substantially vertically axised bearing, a steering post journaled through the bearing, a wheel supporting the steering post and movable therewith for steering adjustments, a pair of handles rearwardly extending from the frames for supporting and propelling the same and pivotally connected therewith for up and down swinging movements, and a cable connected at its ends to the handles and coiled at a medial portion around the steering post for oscillating the same on its axis in response to the opposite swinging movements of the handles.

5. A hand propelled vehicle comprising a frame having a forwardly located and substantially vertically axised bearing, a steering post journaled through the bearing, a wheel supporting the steering post and movable therewith for steering adjustments, a sheave mounted on the steering post, a pair of handles pivotally mounted at the rear of the frame for swinging movements with respect thereto, crank fingers movable by the handles, and a cable secured at its ends to the crank fingers and coiled at an intermediate portion around the sheave to thereby oscillate the steering post in response to swinging movements of the handles.

6. A hand propelled vehicle comprising a frame having a forwardly located and substantially vertically axised bearing, a steering post journalled through the bearing, a wheel supporting the steering post and movable therewith for steering adjustments, a pair of handles rearwardly extending from the frames for supporting and propelling the same and pivotally connected therewith for up and down swinging movements, crank fingers extended from and movable with the handles, a cable secured at its ends to the crank fingers and coiled at an intermediate portion around the steering post for oscillating the same on its axis in response to pulling motion of the fingers as they swing with the handles, and the said fingers having rounded surfaces for engaging and pulling upon the cable.

7. A hand propelled vehicle comprising, a body, spaced tubular side members supporting the body, a bearing member secured to forward ends of the side members, a steering post journaled in the bearing member on a vertical axis, a wheel supporting the steering post and movable therewith for steering purposes, a cable coiled around the steering post and extended therefrom rearwardly through the tubular side members, and handles pivotably mounted at rear ends of the side members for supporting and propelling the vehicle and connected to the ends of the cable for steering the wheel in response to movement about their pivots.

8. A hand propelled vehicle comprising a body, spaced side members supporting the body and having upwardly inclined and forwardly converging ends beneath the body, a wheel mounted beneath the forward ends of the side members for steering movements about a vertical axis, a cable connected to the wheel and operable to steer the same in response to pulling movement on either end of the cable, and handles connected to rear ends of the side members for lifting and propelling the vehicle, the said handles being mounted for up and down movement and connected to the cable for pulling upon the same and steering the wheel.

9. A hand propelled vehicle, comprising a body supported forwardly by at least one wheel mounted for steering movement about a generally upright axis, a pair of handles rearwardly disposed for supporting and propelling the body, the said handles being mounted for up and down swinging movements, means including a flexible member for steering the wheel, the said flexible member having ends connected to the handles, and rounded surfaces on the handles for engaging and exerting endwise forces on the flexible member as the handles are moved up and down.

ADOLPH RONNING.